United States Patent [19]

Harrison

[11] 3,906,349

[45] Sept. 16, 1975

[54] MODULATED CARRIER TRANSMITTING CIRCUIT

[75] Inventor: John R. Harrison, Gibsonia, Pa.

[73] Assignee: Westinghouse Air Brake Company, Swissvale, Pa.

[22] Filed: Mar. 23, 1973

[21] Appl. No.: 344,185

[52] U.S. Cl. ................. 325/105; 307/261; 325/161
[51] Int. Cl. ............................................ H04b 1/04
[58] Field of Search...... 325/64, 105, 123, 161–170, 325/186; 307/260, 261; 328/21, 165, 167; 330/185–186, 199, 135–138; 332/37 R, 37 D, 332/43; 178/66 A, 66 R, 68

[56] References Cited

UNITED STATES PATENTS

| | | | |
|---|---|---|---|
| 2,401,619 | 6/1946 | Trevor | 325/164 |
| 3,202,939 | 8/1965 | Reiling | 332/43 |
| 3,626,417 | 12/1971 | Gilbert | 178/66 R |
| 3,644,832 | 2/1972 | Sherman, Jr. | 325/186 |
| 3,667,049 | 5/1972 | Ostroff et al. | 178/66 A |

OTHER PUBLICATIONS

The Radio Amateur's Handbook 49th Edition June 12, 1972, p. 79.

*Primary Examiner*—Robert L. Griffin
*Assistant Examiner*—Jin F. Ng
*Attorney, Agent, or Firm*—J. B. Sotak; H. A. Williamson

[57] ABSTRACT

This disclosure relates to a fail-safe coded type of keying transmitter for the production and modulation of a carrier signal. Initially, the modulating signal is reshaped to remove the harmonic producing portions therefrom prior to the modulation of a carrier signal. The keying transmitter includes a voltage regulator for stabilizing the d.c. operating potential which powers a carrier signal generating circuit and an electronic switching circuit. The output of the electronic switching circuit is applied to a series resonant L-C circuit which transforms the leading edge of the square wave input signal into one half cycle of a cosine wave and which transforms the trailing edge of the square wave input signal into another half cycle of a cosine wave. An amplifying circuit raises the amplitude of the carrier signal, and a modulating circuit modulates the carrier signal in accordance with the transformed cosine wave.

7 Claims, 1 Drawing Figure

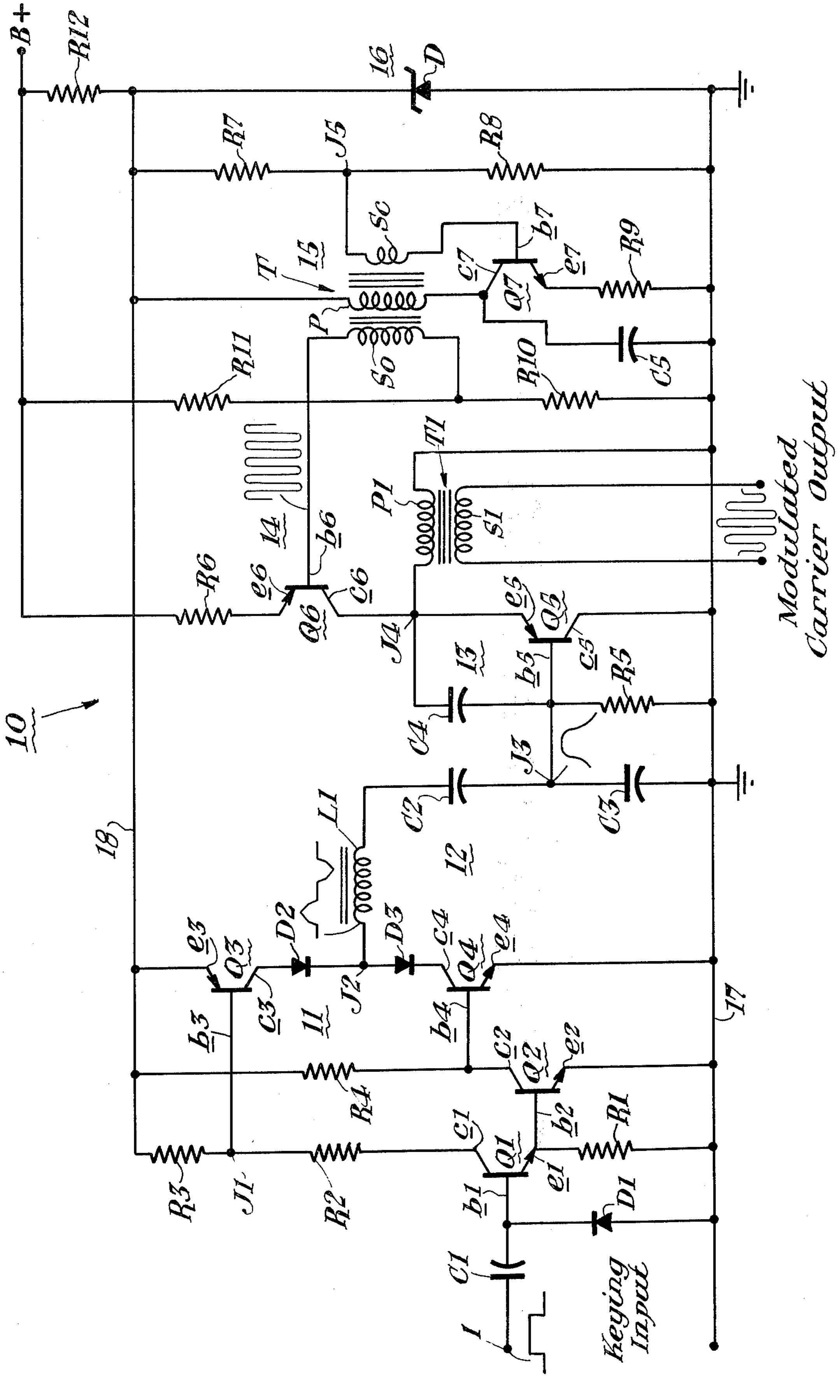
B+
Modulated Carrier Output
Keying Input

MODULATED CARRIER TRANSMITTING CIRCUIT

My invention relates to a coded type of vital keying transmitter and more particularly to a fail-safe electronic transmitting circuit arrangement which removes sharp harmonic producing portions from a square wave signal by transforming the leading and trailing edge of the square wave signal into appropriate sections of a raised cosine wave prior to modulating a carrier frequency signal and which stabilizes the carrier frequency signal by regulating the d.c. supply voltage.

In various types of signal and communication systems, such as railroad and mass and/or rapid transit operations, information and command signals are transmitted through the jointless rails from one end to the other end of a track section. Usually the coded format takes the form of a series of marks and spaces, such as a train of rectangular or square wave pulses. It will be appreciated that rectangular or square waves have sharp demarcation portions which are troublesome to various circuits, particularly to carrier transmission systems which employ tuned receiver circuits. The problem arises from the fact that a rectangular wave form contains an infinite number of harmonics of the fundamental frequency. It has been found that these harmonics are capable of interfering with the normal operation of other receiver circuits in the system. For example, a harmonic of sufficient amplitude will pass through an unrelated receiver circuit tuned to the frequency of the harmonic and will cause the receiver to perform its function, such as, picking up or energizing a relay or the like. Thus, the harmonics should be removed from the coded signals prior to usage in a vital type of transmission system. In an ordinary or nonvital system, it is desirable to eliminate the harmonics simply in order to prevent cross-talk and noise signals from interfering with other circuits. In a vital signal and communication system, this is wholly unacceptable in that a falsely operated circuit could establish a condition which could cause damage to the equipment or could result in injury or death to attending personnel. Another requirement of a vital operation is that each portion or circuit of the transmission system itself must be capable of functioning in a fail-safe fashion. A further area of concern in track circuits is the possible occurrence of a broken rail which results in the fluctuation of the signals received by the wayside receiver. It has been found that the d.c. supply source varies over a wide range of voltage levels which also causes a fluctuation of the transmitted signals and, in turn, the signals received by the receiver. In order to discern between a broken rail failure and a change in the d.c. operating potential, it is necessary to stabilize the d.c. supply voltage by regulation. Hence, the regulating apparatus must operate in a fail-safe manner in order to maintain the integrity of the system. Thus, under no circumstance should a critical circuit or component failure be permitted to allow a transmitter to have its output fluctuate or to produce a modulating signal having a square wave envelope, except at greatly reduced levels.

Accordingly, it is an object of my invention to provide a unique circuit arrangement for reshaping the square wave form of a modulating signal and for removing fluctuations in a modulated carrier wave.

Another object of my invention is to provide a fail-safe code keying transmitting apparatus for stabilizing a modulated carrier wave form for removing sharp harmonic producing portions from the modulated carrier wave form.

A further object of my invention is to provide an improved fail-safe circuit arrangement for transforming a square wave signal into a raised cosine wave and thereafter for modulating a carrier signal for transmission over a communication channel.

Yet another object of my invention is to provide a regulated transmitter circuit which eliminates harmonics in a modulated carrier signal and which operates in a failsafe manner.

Yet a further object of my invention is to provide a code keying carrier transmitting circuit for producing a stabilized modulated carrier signal having an envelope in the form of a raised cosine wave so that harmonics are not present.

Still another object of my invention is to provide a new and improved regulated transmitter for eliminating harmonic frequency signals from a substantially square wave form by transforming the leading edge of the wave form into one half cycle of a raised cosine wave and by transforming the trailing edge of the wave form into the other half cycle of a raised cosine wave and thereafter for modulating a carrier signal with the transformed raised cosine wave.

Still a further object of my invention is to provide a stable wave shaping circuit which eliminates sharp harmonic producing portions of a modulated carrier signal in a fail-safe fashion.

Still yet another object of my invention is to provide a fail-safe electronic transmitting circuit arrangement including a switching circuit, a series L-C network which removes harmonic producing portions of an input signal by transforming each harmonic producing portion into a cosine function, a voltage regulator for stabilizing the d.c. operating potential, a signal oscillator for producing a carrier signal, an amplifier for increasing the carrier gain, and a modulating circuit for receiving the carrier signal which, in turn, is modulated by the transformed signal.

Still yet a further object of my invention is to provide a code keying transmitting apparatus including an electronic switching circuit, an inductance-capacitance circuit, a regulating circuit, an oscillating circuit, an amplifying circuit, an inductance-capacitance circuit, and a clipping amplifying-modulating circuit which is economical in cost, simple in construction, reliable, and efficient in operation.

Briefly, the present invention relates to a fail-safe electronic transmitting apparatus including an electronic switching circuit, a series resonant L-C circuit, a regulating circuit, an oscillating circuit, an amplifying circuit, and a clipping modulating circuit. The electronic switching circuit employs a pair of driving transistors and a pair of series-connected driven transistors. The driving transistors are connected in cascade so that both transistors are simultaneously rendered conductive and nonconductive by the square wave input signals. The conduction of the driving transistors causes one of the driven transistors to be conductive and causes the other driven transistor to be cut off. The conduction of the one driven transistor establishes a charging circuit path for the series resonant L-C circuit so that the leading edges of the square wave input signals are transformed into one half cycle of a raised cosine wave. Conversely, the nonconduction of the driving transistors causes the one driven transistor to cut off and causes the other driven transistor to conduct. The conduction of the other driven transistor establishes a discharge circuit path for the series resonant L-C circuit so that the trailing edges of the square wave input signals are transformed into another half cycle of a raised cosine wave. The transformed waves are applied to the input of the clipping modulating circuit upon which is impressed a carrier signal. The carrier signal is generated by a free running oscillator having a tickler coil for providing regenerative feedback. The carrier signal is applied to a transistor amplifier for increasing the gain, and then the amplifier carrier signal is applied to the input of the modulation circuit. A voltage regulator including a series current limiting resistor and a Zener diode stabilizes and supplies the d.c. operating voltage to the circuits. A modulated carrier signal is derived from the output of the modulating circuit and the modulations will have an envelope in the form of a raised cosine wave so that a stabilized signal having no accompanying harmonics is transmitted to the track rails.

The foregoing objects and other additional features and advantages of my invention will become more fully evident from the following detailed description when considered in connection with the accompanying drawing wherein:

The single FIGURE is a schematic circuit diagram illustrating a preferred embodiment of the present invention.

Referring now to the single FIGURE of the drawing, there is shown a fail-safe electronic code keying transmitting circuit arrangement which is generally represented by the numeral 10. The code keying transmitter circuit arrangement 10 includes a switching circuit generally characterized by the numeral 11, a series-resonant circuit generally characterized by the numeral 12, a modulating circuit generally characterized by the numeral 13, an amplifying circuit generally characterized by the numeral 14, an oscillating circuit generally characterized by the numeral 15, and a shunt regulating circuit generally characterized by the numeral 16.

The switching circuit 11 includes a driving network having a pair of cascaded transistors and a driven network having a pair of series connected transistors. The first stage of the driving network includes an NPN transistor Q1 having an emitter electrode *e*1, a collector electrode *c*1, and a base electrode *b*1. The base electrode *b*1 of transistor Q1 is connected to input keying terminal 1 through coupling capacitor C1. The emitter electrode *e*1 of transistor Q1 is connected to a reference potential, such as ground lead 17, by resistor R1. A diode D1 has its cathode connected to the base electrode *b*1 of transistor Q1. The anode of diode D1 is directly connected to ground. The diode D1 limits the amount of reverse voltage that can be applied to transistor Q1 to prevent damage to the emitter-to-base diode or the transistor Q1 and also results in symmetrical clipping of the input signal. The collector electrode *c*1 is connected to a positive conductor or lead 18 by a pair of series connected resistors R2 and R3.

The second stage of the driving network includes an NPN transistor Q2 having an emitter-electrode *e*2, a collector electrode *c*2, and a base electrode *b*2. The base electrode *b*2 of transistor Q2 is directly connected to the emitter electrode *e*1 of transistor Q1. The emitter electrode *e*2 of transistor Q2 is directly connected to ground while the collector electrode *c*2 of transistor Q2 is connected to the positive lead 18 by resistor R4.

The driven network of the switching circuit 11 includes a first PNP transistor Q3 having an emitter electrode *e*3, a collector electrode *c*3, and a base electrode *b*3. The base electrode *b*3 of transistor Q3 is directly connected to a junction point J1 formed between resistors R2 and R3. The emitter electrode *e*3 of transistor Q3 is directly connected to the positive lead 18. The collector electrode *c*3 of transistor Q3 is connected to the anode of an isolation diode D2. The cathode of the diode D2 is connected to a junction point J2.

The driven network also includes a second NPN transistor Q4 having an emitter electrode *e*4, a collector electrode *c*4, and a base electrode *b*4. The base electrode *b*4 of transistor Q4 is directly connected to the collector electrode *c*2 of transistor Q2 while the emitter electrode *e*4 of transistor Q4 is directly connected to ground. The collector electrode *c*4 of transistor Q4 is connected to the cathode of an isolation diode D3 while the anode of the diode D3 is connected to the junction point J2. Thus, it will be seen that the conductive condition of transistor Q3 is controlled by the transistor Q1 while the conductive condition of transistor Q4 is controlled by transistor Q2.

The series resonant circuit 12 includes an inductor L1 and a pair of capacitors C2 and C3. One end of the inductor L1 is connected to the junction point J2 while the other end of the inductor L1 is connected to the upper plate of the capacitor C2. The lower plate of the capacitor C2 is coupled to the upper plate of a capacitor C3 while the lower plate of capacitor C3 is directly connected to ground reference. The capacitors C2 and C3 form a capacitance divider wherein a preselected amount of output voltage is derived from across capacitor C3, namely, between junction point J3 and ground. For example, the capacitance divider permits the output voltage to be reduced to a given level and allows the d.c. zero line to be moved to an optimum position.

The clipping modulating circuit 13 includes an active element in the form of a PNP transistor Q5 arranged in emitter-follower configuration. The amplifying transistor Q5 includes an electrode emitter *e*5, a collector electrode *c*5 and a base electrode *b*5. The base electrode *b*5 of transistor Q5 is directly connected to junction point J3 and is connected to ground by biasing resistor R5 with resulting base injection. The collector electrode *c*5 of transistor Q5 is directly connected to ground while its emitter electrode *e*5 is directly connected to junction point J4. The collector electrode *c*5 is also coupled to the base electrode *b*5 by means of tuning capacitor C4. As mentioned, the modulating signal is coupled to the base electrode *b*5 while the carrier signals are applied to the collector electrode *c*5 of transistor Q5 by the carrier amplifying stage 14.

The amplifying circuit 14 includes a PNP transistor Q6 having an emitter electrode *e*6, a collector electrode *c*6, and a base electrode *b*6. The collector electrode *c*6 of the amplifying transistor Q6 is directly connected to the emitter electrode *e*5 of the modulating transistor Q5. The emitter electrode *e*6 of transistor Q6 is connected to the positive terminal B+ of a suitable source of d.c. operating or supply potential (not shown).

The carrier signals are generated by a free-running oscillator having an active element in the form of an NPN transistor Q7. The oscillator transistor Q7 includes a base electrode $b7$, a collector electrode $c7$, and an emitter electrode $e7$. The base electrode $b7$ of transistor Q7 is connected to junction point J5 between the voltage dividing resistors R7 and R8 through a tickler feedback coil Sc which is one of two secondary windings of transformer T. The emitter electrode $e7$ of transistor Q7 is connected to ground via swamping resistor R9 which improves the stability of the circuit by providing degenerative feedback. A resonant circuit including a primary winding P of transformer T and a capacitor C5 determine the frequency of oscillations of the oscillator. One end of the capacitor C5 is connected to ground while the other end is connected in common with the collector electrode $c7$ and the lower end of the primary winding P. The upper end of the primary winding P is connected to the positive d.c. supply conductor 18. In the present case, the a.c. output signals generated by the oscillator are induced into a secondary winding S*o* of the transformer T which provides isolation. As shown, one end of the secondary winding S*o* is connected to input base electrode $b6$ of the amplifying transistor Q6 while the other end of secondary winding S*o* is connected to junction point J6 formed between resistors R10 and R11. As shown, resistor R10 is connected to ground while the resistor R11 is connected to the positive terminal B+ of the d.c. supply source.

The shunt regulator 16 includes a current limiting resistor 12 and a voltage breakdown device, such as a Zener diode D. The upper end of the resistor R12 is connected to the positive terminal B+ of the supply source. The lower end of resistor R12 is connected to the cathode of Zener diode D while the anode of Zener diode D is connected to the common terminal or ground of the d.c. supply source. Thus, the Zener diode D stabilizes the d.c. supply source and ensures the voltage level on lead 18 remains substantially constant irrespective of any voltage fluctuations which may appear on the positive terminal B+. As will be described in greater detail hereinafter, the a.c. impedance characteristic of the Zener diode D is employed to control the regenerative feedback of the oscillating circuit 15.

An inductor, in the form of a primary winding P1 of a transformer T1, is connected between the emitter electrode $e5$ and collector electrode $c5$, and the modulated output signals are effectively derived across junction point J4 and ground, as will be described in detail hereinafter. It will be appreciated that the capacitor C4 and the inductor P1 form a resonant circuit which is tuned to the frequency of the carrier signal. It will be understood that since the capacitive value of capacitor C3 is several orders of magnitude greater than that of capcitor C4, the lefthand plate of capacitor C4 is effectively connected to ground so that an a.c. path is available for the carrier frequency signals. The modulated carrier is induced into secondary winding S1 of the transformer T1 which in turn is directly or indirectly connected to the rails at the transmitter end of the track section.

In describing the operation, let us initially assume that the circuit is intact and is operating properly and that a series of coded square or rectangular waves are applied across input terminal 1 and ground. After a few cycles of operation, the output developed in primary winding P1 and, in turn, induced in secondary winding S1 will be an amplitude modulated carrier signal having an envelope or outline of raised cosine waves. Thus, when a positive voltage appears on input terminal 1, the transistor Q1 is rendered conductive. The conduction of transistor Q1 causes forward biasing of the base emitter of the transistor Q2 so that transistor Q2 is also rendered conductive. The conduction of transistor Q2 zero biases transistor Q4 so that transistor Q4 is cut off. However, the conduction of transistor Q1 causes forward biasing of transistor Q3 so that transistor Q3 is rendered conductive. The conduction of transistor Q3 establishes a circuit path from the positive terminal B+ through emitter electrode $e3$, collector electrode $c3$, diode D2, through the series resonant circuit including inductor L1 and capacitors C2 and C3 to ground. Thus, the voltage at junction point J2 will suddenly rise to the B+ voltage level. The voltage swing is unimpeded since transistor Q4 is cut off. The increase in voltage causes the current to begin flowing through the L-C circuit, and the amount of current flowing through the inductor L1 is proportional to E/R. The current rises from a zero value to a maximum positive peak value and then returns to a zero level within a period of time dependent upon the L-C characteristic of the circuit. The reversal current in inductor L1, which would normally occur in a resonant circuit, is prevented by the isolation diode D2. When the current through and voltage across inductor L1 return to zero, the junction J2 will be at the same potential as the voltage across capacitors C2 and C3, which will be supply voltage multiplied by the transistor Q5 resonant circuit formed by inductor L1 and capacitors C2 and C3. Conversely, the initial voltage across the inductor L1 is at a maximum level but is 90° out of phase with the current in inductor L1. At a given time, the instantaneous value of the inductor L1 passes through the zero point, and then reaches a maximum negative level. At this time, it quickly returns to the zero level. Initially, the voltage across capacitors C2 and C3 is at some negative value since it is a function of the B+ voltage and inductor voltage. It will be appreciated that the charging circuit builds up the voltage across the capacitors C2 and C3. Thus, the output voltage developed across capacitor C3 and appearing at junction J3 follows a raised cosine wave form. It will be appreciated that the rise time of the raised cosine wave form is equal to one-half of a cycle of the resonant frequency of the L-C network. Thus the output voltage across capacitor C3 will continue to rise until a maximum level is reached at the given time. Thus, the leading edge of the aquare wave keying pulse is transformed into a gradual rising cosine wave so that the sharp harmonic producing portions are removed from the rectangular input signal. In time, the voltage at junction point J2 is raised to Q times the value of B+ where Q is the gain of the resonant circuit. The output voltage across capacitor C3 will remain at its maximum positive level throughout the remainder of the marking pulse. That is, since the current is at zero and the voltage across the inductor has returned to zero, the voltage will stop changing the capacitor. It will be noted that no power is lost during this nonchanging period, namely, during the zero current period or dead space time since diode D2 blocks reverse current flow to the B+ supply terminal and the diode D3 and nonconducting transistor Q4 block current flow to ground and the resistive value of resistor R5 is relatively high so that little change occurs during this period.

Now when the trailing edge of the marking pulse appears at the input terminal T1, the transistor Q1 will revert to a nonconducting condition since the input voltage is zero during the ensuing spacing period. The nonconduction of transistor Q1 removes the forward biasing from base-emitter electrodes of transistor Q3 so that transistor Q3 is rendered nonconductive. In addition, the nonconduction of transistor Q1 removes the forward biasing from transistor Q2 so that it is rendered nonconductive. The nonconduction of transistor Q2 causes a positive biasing voltage to appear on the base electrode *b*4 so that transistor Q4 is rendered conductive. The conduction of transistor Q4 establishes a discharge circuit path for the series resonant frequency circuit through diode D3 and the base-emitter electrodes of transistor Q4. The conduction of the transistor Q4 pulls the junction point J2 down to a zero potential or ground level. Thus, at this time, the current $I_L$ begins flowing through conductor L1 in the reverse direction and goes through a negative cycle. Also the voltage $E_L$ across inductor L1 instantly goes to a maximum negative level and gradually moves in a positive direction until it suddenly drops to a zero value. Isolation diode D3 prevents the resonant circuit from causing current to flow in the reverse direction. During this period the voltage across capacitor C3 gradually decreases so that the other half cycle of the raised cosine wave is formed. Thus, during the trailing edge, the output signal also follows a cosine wave having a decay time which is proportional to one-half cycle of the resonant frequency of the L-C circuit. Again, the sharp harmonic producing portions of the input signal are removed so that unwanted harmonic frequencies are removed from the output. The output wave will assume a maximum negative level and will remain at this level until a subsequent marking pulse appears on the input terminal T1. That is, since the current is at zero and the voltage across the inductor has returned to zero, the voltage across capacitors C2 and C3 will stop changing. It will be appreciated that the peak-to-peak amplitude of the output voltage developed across capacitor C3 is $$\frac{C3}{C2+C3}$$

times the total voltage developed across capacitors C2 and C3, wherein the total voltage is Q times the voltage B+. It will be appreciated that each and every subsequent marking pulse of the train will cause a similar shaping effect so that no harmonics will exist in the output voltage developed across capacitor C3. Thus, the square or rectangular input signals are transposed into sections of raised cosine waves so that all harmonic frequencies are removed from the output voltage on junction J3.

Let us now proceed with a detailed description of oscillating circuit 15 and its operation of the generation of the carrier wave form according to the present invention. It has been found advantageous to optimize the circuit operation by selecting suitable values of resistances of resistors R7 and R8 so that symmetrical clipping will result. Thus, oscillations will begin to occur in circuit 15 when power is applied and the normal biasing conditions are reached. It will be appreciated that the amplitude of the current flowing in the circuit will increase until a normal condition is reached due to the regenerative feedback coupled from the output circuit to the input circuit by the transformer windings. That is, the amount of feedback voltage induced in secondary winding S*c* steadily increases as the output voltage in primary winding P increases due to the increase of current flowing therein. It will be appreciated that a.c. carrier voltage is also induced in the secondary coil S*o* so that a.c. output carrier signals are supplied to the input of the amplifying circuit 14 when the oscillator is oscillating. Under normal conditions of operation, the Q of the series resonant circuit and, in turn, the Q of the oscillator, namely, the quality factor, is relatively high when the circuit resistance is relatively low. That is, when the Zener diode D is operating properly and goes into conduction, it exhibits a low dynamic impedance which allows a high quality factor to be maintained. Conversely, if an insufficient amount of supply voltage is applied to terminal B+, the Zener diode D will not break down and, therefore, it will exhibit a relatively high dynamic impedance so that the quality factor is relatively low and no oscillations will occur. As mentioned above, the d.c. operating point of the transistor Q7 is selected to be on the linear portion of the dynamic transfer characteristic curve. In fact, the parameters of the oscillator circuit 15 are chosen such that the transistor is driven slightly into saturation, then to cutoff, then back to saturation, etc. Thus, a slight clipping effect occurs at the peak of each alteration of the a.c. output signal. It will be appreciated that the time it takes to change from saturation to cutoff is determined by the tank circuit, namely, the resonant circuit which, in turn, determines the frequency of oscillation. The carrier oscillations induced into secondary winding S*c* are amplified by the transistor stage Q6. The collector electrode *c*6 supplies the amplified carrier signals to the emitter electrode *e*5 of the modulating transistor Q5.

If it is assumed that the carrier is undergoing full or (100%) modulation, then the amplitude of the carrier is at times its unmodulated value and is at other times zero. As the instantaneous value of the modulating signal changes, it will be seen that a variation occurs in the biasing voltage on base electrode *b*5. At certain times, no output is available at the junction point J4 since the carrier signal is shunted to ground by the conduction of transistor Q5. That is, the junction point J4 is effectively tied to ground through the emitter-collector electrodes of transistor Q5. Now as the modulating signal begins to rise a reverse biasing voltage will appear on the base electrode *e*5 of transistor Q5. It will be seen that the amount of voltage is equal to the instantaneous value of the raised cosine signal. Thus, the modulating signal will begin to drive transistor Q5 to cutoff. The carrier signal is now fed to the resonant circuit formed by capacitor C4 and inductor L2. Now when the instantaneous positive value of the carrier signal exceeds the instantaneous value of the modulating signal, the transistor Q5 will begin conducting and will clip the remaining portion of the carrier signal. However, since the resonant circuit has sufficient Q, the inductance and capacitance will resonate at the frequency of the carrier and will cause the modulated output signal to have a negative portion. The modulating circuit will continue to clip the carrier signal in accordance with the instantaneous value of the modulating signal so that the leading edge of the envelope of the modulated signal will resemble the raised wave form. If we assume that the peak value of the carrier signal is equal to the maximum value of the modulating signal, then the modulated signal will have a peak-to-peak value of twice the carrier signal during the time that the raised cosine signal is at its maximum value. At a given time, the trailing edge of the raised cosine modulating signal will begin so that the amplitude of the modulated signal will commence to decrease until no modulations will be produced on junction point J4. The same type of operation and modulation will occur upon the appearance of each subsequent modulating pulse so that the envelope or outline of the modulated signal will resemble the wave form of the modulating signal.

Thus, modulated carrier is developed across primary winding P1 and is induced in the secondary winding S1 of transformer T1. The modulated signals induced in winding S1 may be directly conveyed by suitable leads, such as, a twisted pair of line wires to the track rails (not shown) or may be amplified and then connected to the track rails. Thus, the modulated signals present no interference problems to other tuned circuits in the area since the only sidebands would be those equal to the carrier frequency plus and minus the modulation frequency.

As previously mentioned, the code keying transmitting circuit 10 operates in a fail-safe manner in that the failure of any active or passive element results in its inability to perform the necessary switching, oscillating, regulating, or modulating function. One of the most critical failures is the possibility of turns shorting in the inductor L1. However, while the shorting of turns causes a squaring of the output voltage, it will be appreciated that the amplitude of the output voltage will be only (1/Q) times as great. Thus, it can be seen that any other failure which tends to distort the desired wave shape also greatly reduces the amplitude of the output. Therefore, most circuits will be insensitive and will not be adversely affected by such any spurious frequency signal generation at such greatly reduced levels. An unsafe failure could normally occur if the capacitor C3 would become open-circuited since the modulating signal would become distorted. However, it has been found that by employing the capacitor C3 as the return to ground path for the capacitor C4, the opening of the capacitor C3 interrupts the carrier frequency resonant circuit of the modulating circuit. Thus, even though the modulating signal is distorted, the modulating signal is no longer tuned to the carrier frequency so that little, if any, output is available at junction point J4. Further, if any other of the components fail, either the d.c. supply potentials are removed or the a.c. operating characteristics of the transistor oscillator or amplifier are destroyed. It will be seen that the short-circuiting of the Zener diode D removes the necessary biasing and supply potentials from the circuit while an open-circuited condition destroys the oscillating ability of the circuit 15. In fail-safe operation, critical resistors cannot become short-circuited in that they are constructed of carbon composition material which can only become open-circuited. Thus, it will be seen that the opening of biasing resistors will destroy the d.c. biasing conditions of the transmitter circuit or interrupt the a.c. signal path necessary for producing keying pulse or carrier oscillations. It will be seen that the opening of any single winding will prevent oscillations from occurring. For example, if secondary winding *Sc* opens, no regenerative feedback occurs. If primary winding P opens, no voltage will be induced in either secondary winding *Sc* or secondary winding *So*. If secondary winding *So* opens, no input signal is applied to the input of amplifying transistor Q6. Further, it will be appreciated that if a short appears between the turns of any winding, a decrease in the output signal will occur due to the loading effect of the shorted turns and the loss of Q. If the capacitor C5 becomes open-circuited or short-circuited, the resonant circuit is interrupted or its resonance is destroyed, respectively. The opening of any electrode or the shorting between the electrodes destroys the amplifying characteristics of the transistors so that no output signal will be produced during such failures. Thus, it is apparent that the presently described signal generator operates in a fail-safe manner in that no critical circuit or component failure is capable of producing a false output signal across secondary winding S1, or allowing oscillations to continue in an unregulated mode.

Although specific NPN and PNP transistors have been illustrated, it is understood that transistors of the opposite conductivity, namely, PNP and NPN transistors may be used in the various circuits with merely a polarity reversal of the supply voltage and the Zener diode D. Similarly, while the present invention has been described in connection with a common-emitter transistor configuration, it is readily apparent that other transistor arrangements, namely, a common-base or a common-collector amplifier may be employed by merely arranging the input and output as is readily known to those skilled in the art. Similarly, it is apparent that the output may be taken from any convenient place in the circuit, such as from across the capacitor C or the like. In addition, other oscillator circuits and regulating devices may be employed in practicing the presently described invention.

It will also be appreciated that while this invention finds particular utility in mass and/or rapid transit signal and communication equipment, it is readily evident that the invention is not merely limited thereto but may be employed in various systems and apparatus wherein similar requirements and conditions exist without departing from the spirit and scope of this invention.

It will also be apparent that other modifications and changes can be made in the presently described invention and, therefore, it is understood that all changes, equivalents, and modifications within the spirit and scope of the present invention are herein meant to be included in the appended claims.

Having thus described my invention, what I claim is:

1. A fail-safe electronic transmitting apparatus comprising, a source of d.c. operating potential for powering the apparatus, a voltage regulator connected to said source of d.c. operating potential for regulating said d.c. potential source, said voltage regulator including a Zener diode, a signal oscillator having a resonant frequency determining circuit coupled to said Zener diode of said voltage regulator for producing a carrier wave, a switching circuit coupled to said Zener diode of said voltage regulator and having a source of square wave pulses connected to its input, an inductive-capacitive network including an inductor and a pair of capacitors connected to the output of said switching circuit for reshaping said square wave pulses into raised cosine wave forms, an amplifying circuit for increasing the amplitude of said carrier wave, and a modulating circuit including a series resonant circuit having an inductor and a capacitor connected to ground via one of said pair of capacitors of said inductive-capacitive network for modulating said carrier wave in accordance with said reshaped raised cosine wave forms when and only when no critical component or circuit failure, such as, the short-circuiting of said Zener diode which removes the necessary biasing and supply potentials from the signal oscillator as well as the open-circuiting of said Zener diode which results in interruption of said resonant frequency determining circuit of said signal oscillator and the opening of said one of said pair of capacitors which interrupts said series resonant circuit of said modulating circuit, is present.

2. The fail-safe electronic transmitting apparatus as defined in claim 1, wherein said pair of capacitors a capacitor voltage dividing circuit

3. The fail-safe electronic transmitting apparatus as defined in claim 1, wherein said modulating circuit includes a transistor stage having said raised cosine wave forms injected into its base electrode.

4. The fail-safe electronic transmitting apparatus as defined in claim 1, wherein a transformer is coupled to the output of said amplifying circuit and said modulating circuit.

5. The fail-safe electronic transmitting apparatus as defined in claim 1, wherein said signal oscillator is coupled to said modulating circuit by a transistor amplifier stage.

6. The fail-safe electronic transmitting apparatus as defined in claim 1, wherein said signal oscillator comprises a transformer coupled feedback transistor amplifier.

7. The fail-safe electronic transmitting apparatus as defined in claim 1, wherein said switching circuit a pair of input driving transistors and a pair of output driven transistors.

* * * * *